(12) United States Patent
Chandran Suja et al.

(10) Patent No.: US 12,195,693 B2
(45) Date of Patent: Jan. 14, 2025

(54) FULLY MISCIBLE ANTIFOAM FORMULATIONS

(71) Applicant: The Board of Trustees of the Leland Stanford Junior University, Stanford, CA (US)

(72) Inventors: Vineeth Chandran Suja, Cambridge, MA (US); Gerald G. Fuller, Stanford, CA (US); Suzanne G. K. Calhoun, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 18/280,389

(22) PCT Filed: May 26, 2022

(86) PCT No.: PCT/US2022/031097
§ 371 (c)(1),
(2) Date: Sep. 5, 2023

(87) PCT Pub. No.: WO2022/251469
PCT Pub. Date: Dec. 1, 2022

(65) Prior Publication Data
US 2024/0076573 A1    Mar. 7, 2024

Related U.S. Application Data

(60) Provisional application No. 63/193,666, filed on May 27, 2021.

(51) Int. Cl.
*C10M 169/00*  (2006.01)
*B01D 19/04*  (2006.01)
(Continued)

(52) U.S. Cl.
CPC ....... *C10M 169/00* (2013.01); *B01D 19/0431* (2013.01); *C10L 1/08* (2013.01);
(Continued)

(58) Field of Classification Search
CPC .............. C10M 169/00; C10M 127/06; C10M 2203/06; C10M 2203/10; C10M 2229/025;
(Continued)

(56) References Cited

U.S. PATENT DOCUMENTS

2016/0257904 A1* 9/2016 Mayernick ........... C10M 169/04
2018/0237711 A1* 8/2018 Clark ........................ C10L 1/08
(Continued)

*Primary Examiner* — Ellen M McAvoy
(74) *Attorney, Agent, or Firm* — LUMEN PATENT FIRM

(57) ABSTRACT

Miscible antifoams are provided that do not separate out of a target liquid and that are easy to incorporate in the target liquid. A method or system involves mixing a liquid ('a miscible antifoam') into a target foaming liquid. This miscible antifoam is engineered/chosen such that it has both a higher surface tension and is more volatile than the target liquid, or engineered such that it has both a lower surface tension and is less volatility than the target liquid. The miscible antifoam leads to surface tension gradients that cause bubble rupture up to 10 times faster than the target liquid without the antifoam. Further, the miscible antifoams are easy to incorporate and do not separate out from the target liquid during operation—both of which are key limitations faced by existing antifoams.

6 Claims, 4 Drawing Sheets

| Foaming Liquid | $\gamma_{fl}$ (mN/m) | Miscible Antifoam | $\gamma_{af}$ (mN/m) | $\Delta\gamma$ (mN/m) |
|---|---|---|---|---|
| 5 cSt Silicone Oil | 19.7 | Kerosene | 26.57 | 6.87 |
| | | Toluene | 28 | 8.3 |
| | | Xylene | 29 | 9.3 |
| 50 cSt Silicone Oil | 20.8 | Kerosene | 26.57 | 5.77 |
| | | Toluene | 28 | 7.2 |
| | | Xylene | 29 | 8.2 |
| 100 cSt Silicone Oil | 20.9 | 2 cSt Silicone Oil | 18.7 | -2.1 |
| | | Kerosene | 26.57 | 5.67 |
| | | Toluene | 28 | 7.1 |
| | | Xylene | 29 | 8.2 |
| 500 cSt Silicone Oil | 21.1 | Kerosene | 26.57 | 5.47 |
| | | Toluene | 28 | 6.9 |
| | | Xylene | 29 | 7.9 |

(51) Int. Cl.
  *C10L 1/08* (2006.01)
  *C10M 127/06* (2006.01)
  *C10N 30/18* (2006.01)

(52) U.S. Cl.
  CPC ... *C10M 127/06* (2013.01); *C10L 2200/0446* (2013.01); *C10L 2230/082* (2013.01); *C10M 2203/06* (2013.01); *C10M 2203/10* (2013.01); *C10M 2229/025* (2013.01); *C10N 2030/18* (2013.01)

(58) Field of Classification Search
  CPC .................. B01D 19/0431; C10L 1/08; C10L 2200/0446; C10L 2230/082; C10N 2030/18
  See application file for complete search history.

(56) References Cited

U.S. PATENT DOCUMENTS

| | | | |
|---|---|---|---|
| 2019/0284501 A1* | 9/2019 | Seto | C10M 169/044 |
| 2020/0199477 A1* | 6/2020 | Blumenfeld | C10M 169/041 |
| 2020/0339902 A1* | 10/2020 | Blumenfeld | C10M 111/04 |
| 2021/0009912 A1* | 1/2021 | Bush | C10L 1/2364 |
| 2021/0024850 A1* | 1/2021 | Perera | C10M 147/04 |
| 2022/0041945 A1* | 2/2022 | Peggau | C08L 83/12 |
| 2023/0159848 A1* | 5/2023 | Takagi | C08F 2/08 508/206 |

\* cited by examiner

| Foaming Liquid | $\gamma_{fl}$ (mN/m) | Miscible Antifoam | $\gamma_{af}$ (mN/m) | $\Delta\gamma$ (mN/m) |
|---|---|---|---|---|
| 5 cSt Silicone Oil | 19.7 | Kerosene | 26.57 | 6.87 |
| | | Toluene | 28 | 8.3 |
| | | Xylene | 29 | 9.3 |
| 50 cSt Silicone Oil | 20.8 | Kerosene | 26.57 | 5.77 |
| | | Toluene | 28 | 7.2 |
| | | Xylene | 29 | 8.2 |
| | | 2 cSt Silicone Oil | 18.7 | -2.1 |
| 100 cSt Silicone Oil | 20.9 | Kerosene | 26.57 | 5.67 |
| | | Toluene | 28 | 7.1 |
| | | Xylene | 29 | 8.2 |
| 500 cSt Silicone Oil | 21.1 | Kerosene | 26.57 | 5.47 |
| | | Toluene | 28 | 6.9 |
| | | Xylene | 29 | 7.9 |

FIG. 1

FULLY MISCIBLE ANTIFOAM FORMULATIONS

CROSS-REFERENCE TO RELATED APPLICATIONS

This application is a 371 of PCT application PCT/US2022/031097 filed May 26, 2022. PCT application PCT/US2022/031097 claims the benefit of U.S. Provisional application 63/193,666 filed May 27, 2021.

FIELD OF THE INVENTION

This invention relates to antifoams.

BACKGROUND OF THE INVENTION

Antifoams (also referred to as defoamers) are additives, having a 3.2-billion-dollar market cap, that are used to are used to control deleterious foaming in liquids such as lubricants and diesel fuels. Usually, antifoams are in the form of dispersed particles or immiscible droplets, which are difficult to incorporate and susceptible to separation from the liquid during operation due to gravity induced separation and during liquid filtration. Once the antifoams separate from the foaming liquid, they are effectively useless, leading to deleterious and unintended foaming.

Existing antifoams break up foams through either spreading or bridging-dewetting mechanisms. Both these mechanisms require the antifoams to remain as immiscible dispersed particulates, which have limitations as previously mentioned.

SUMMARY OF THE INVENTION

In one embodiment the invention is a miscible antifoam formulation with a target foaming liquid having a target liquid surface tension and a target liquid volatility. Mixed with the target liquid is an antifoam liquid having an antifoam liquid surface tension and an antifoam liquid volatility. In one example, the target liquid surface tension and the target liquid volatility are both lower than the antifoam liquid surface tension and the antifoam liquid volatility. In another example, the target liquid surface tension and target liquid volatility are both higher than the antifoam liquid surface tension and antifoam liquid volatility.

In another embodiment, the invention is a method of making a miscible antifoam formulation. One would have a target liquid that has a target liquid surface tension and a target liquid volatility. Mixed with the target liquid is an antifoam liquid that has an antifoam liquid surface tension and an antifoam liquid volatility. In one example, the target liquid surface tension and the target liquid volatility are both lower than the antifoam liquid surface tension and the antifoam liquid volatility. In another example, the target liquid surface tension and target liquid volatility are both higher than the antifoam liquid surface tension and antifoam liquid volatility.

Volume concentrations for the antifoam liquid can be between 0.5% and 5% and the target liquid between 99.5% and 95%.

Definitions

Surface tension is a thermodynamic property of a liquid surface arising from molecular interactions, and defined as the force exerted per unit length that tends to minimize the liquid surface area. Surface tension of a liquid can be measured by standard tests such as the ASTM D971 test (employing the Du Nouy ring method), the pendant drop method and the Wilhelmy plate method.

Volatility of a liquid is the tendency of a liquid to change to a gaseous state, and is quantified by measuring the associated thermodynamic property called as Vapor pressure. Vapor pressure can be measured using the ASTM D2879 (employing an isoteniscope) and ASTM E1194 (employing the gas saturation technique).

EXAMPLES

Examples of a miscible antifoam are: Kerosene, Toluene and Xylene

Examples of a target liquid are: Lubricants (e.g. Group I, II and III) and Diesel fuels.

Advantages

Embodiments of the invention have the advantage that the miscible antifoam is easy to incorporate into the target liquid and does not separate out of the target liquid.

Applications

Embodiments of the invention are useful anytime foaming is detrimental, such as in a lubricant or as a diesel antifoam/additive, especially useful to manufacturers such as Lubrizol and Momentive.

BRIEF DESCRIPTION OF THE DRAWINGS

FIG. 1 shows according to an exemplary embodiment of the invention the properties of the various components of tested systems with calculated differences in surface tension.

(FIG. 3B) 3 different example miscible antifoams (Kerosene, Toluene, and Xylene) each treating the foaming liquid 100 cSt silicone oil in varying volume concentrations. Bubble lifetimes are normalized by the coalescence time in the target liquid without antifoams.

DETAILED DESCRIPTION

Here the inventors disclose miscible antifoams and a method thereof leveraging the physical mechanism of evaporation induced gradients in surface tension. Gradients in surface tension can occur between the bubble apex and surrounding bulk liquid, driven by differences in solute concentration or surfactant concentration—or caused by differences in relative species concentrations in multicomponent systems. These surface tension gradients cause Marangoni flows, induced liquid flows from low to high surface tension. Evaporation can drive these surface tension gradients in multicomponent liquids with differential volatilities and surface tension, as evaporation of a higher volatility liquid creates spatial heterogeneities in species concentration. These evaporation-induced Marangoni flows have been observed stabilizing bubbles and foams, when a lower surface tension liquid evaporating from the top of the bubble induces a flow from bulk liquid toward the apex, delaying coalescence. The strength of evaporation induced flows correlates with evaporation rate and with relative volume fractions of the component liquids. However, Marangoni flows have not been engineered for destabilizing a bubble or thin film.

To overcome the limitation(s) in the art, the inventors have conceived that antifoams can be engineered to break up foams through a different physical mechanism—species concentration induced surface tension gradients (also referred to as Marangoni flows). This different physical mechanism makes fully miscible antifoams possible.

To demonstrate this mechanism, the inventors made use of single bubble coalescence experiments on several potential foaming liquids blended with miscible antifoams having a range of surface tension differences ($\Delta\gamma$) and viscosity ratios (FIG. 1).

Figure 2:
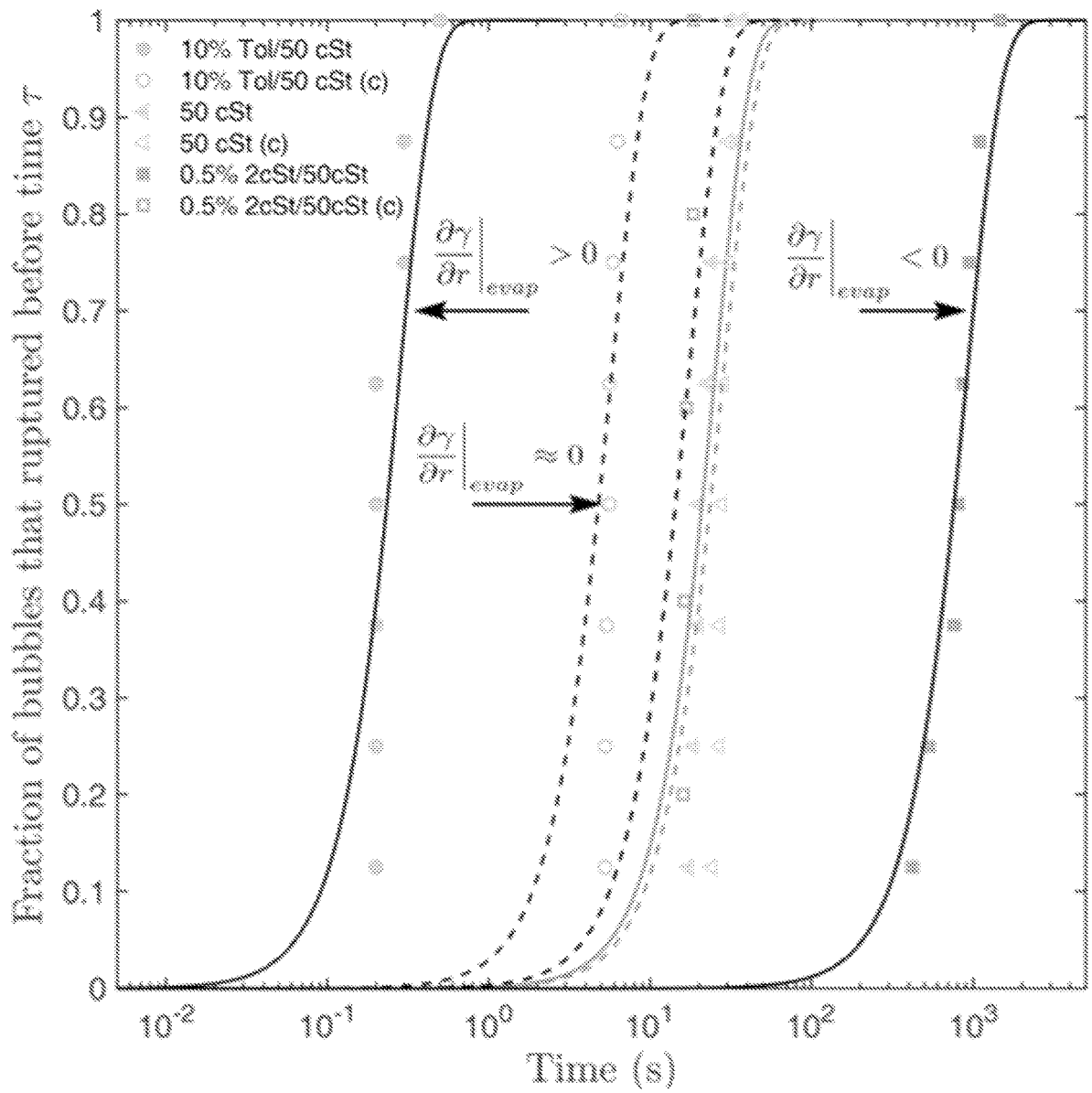
FIG. 2 shows according to an exemplary embodiment of the invention Cumulative Coalescence-time Curves of 50cSt Silicone oil pure mixed with 10% Toluene and 0.5% 2 cSt silicone oil. 'c' indicates absence of evaporation.

To visualize the results of the single bubble experiments, the coalescence times of single bubbles measured in the DFI (Dynamic Fluid-Film Interferometer) can be plotted versus the fraction of tested bubbles in a given sample (FIG. 2). Bubbles rupturing naturally are known to generally exhibit a distribution of coalescence times that follows the Rayleigh distribution. Therefore, to rank the bubble stability across tested samples, one could then conveniently fit experimental coalescence times to a Rayleigh cumulative distribution function using maximum likelihood estimation. These characteristic curves of the distribution of bubble coalescence times in a certain sample are termed cumulative coalescence-time curves (CCCs), where curves at larger time values correspond to samples that sustain more stable foams.

FIG. 2 is a representative antifoam mixture showing the effectiveness of this antifoam mechanism, illustrated in a Cumulative Coalescence-time Curves (CCC) plot. The sample shown is 50 cSt silicone oil as the foaming liquid, and toluene as an example of an effective miscible antifoam added at 10% volume fraction. Pure 50 cSt silicone oil produces fairly stable bubbles, with similar stability when closed to evaporation and open to evaporation. With the addition of the toluene antifoam and when open to evaporation, the bubbles are much less stable, as the Rayleigh distribution moves far to the left on the plot. When closed to evaporation, the sample with antifoam is less stable than the closed pure 50 cSt silicone oil sample, but not as destabilized as the open trials, which confirms that this mechanism is primarily driven by evaporation. A volume fraction of 0.5% 2 cSt silicone oil shows an ineffective choice of a miscible antifoam, where evaporation leads to stabilizing induced flows and increase in bubble stability, due to the lower surface tension of the evaporating liquid, the 2 cSt silicone oil.

Figure 3B:
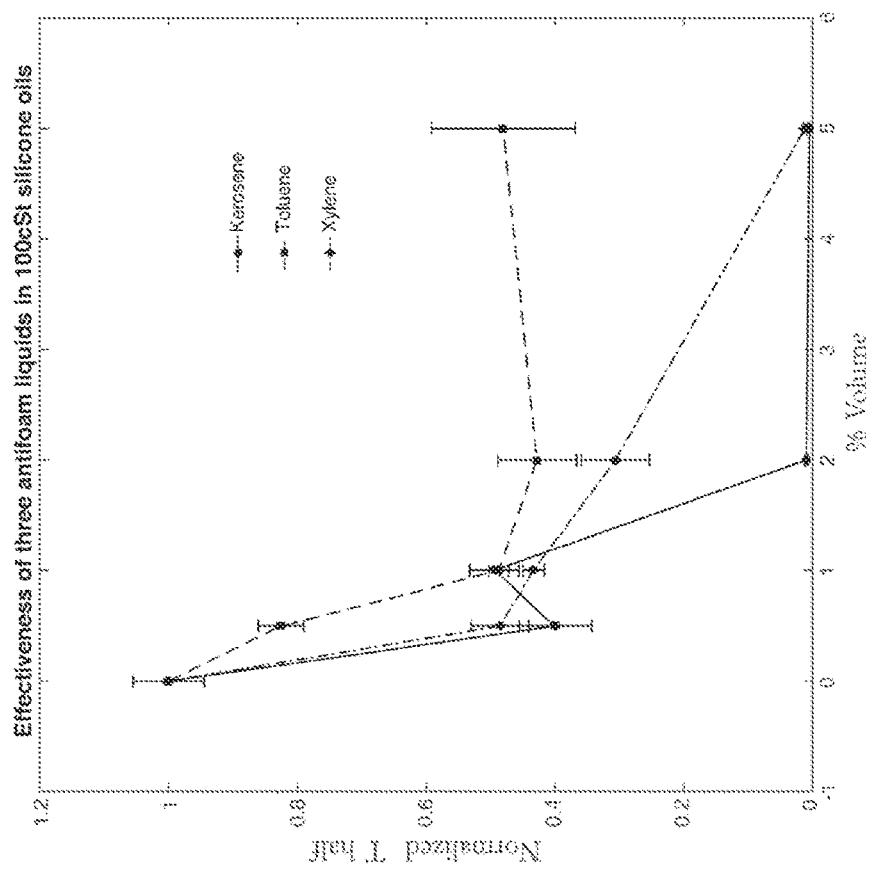
FIGS. 3A-B show according to an exemplary embodiment of the invention normalized mean bubble lifetimes versus antifoam volume fraction for (FIG. 3A) 4 different foaming liquids (5 cSt, 50cSt, 100 cSt, 500 cSt silicone oil) each treated with varying concentrations of an example miscible antifoam Kerosene.
Figure 3A:
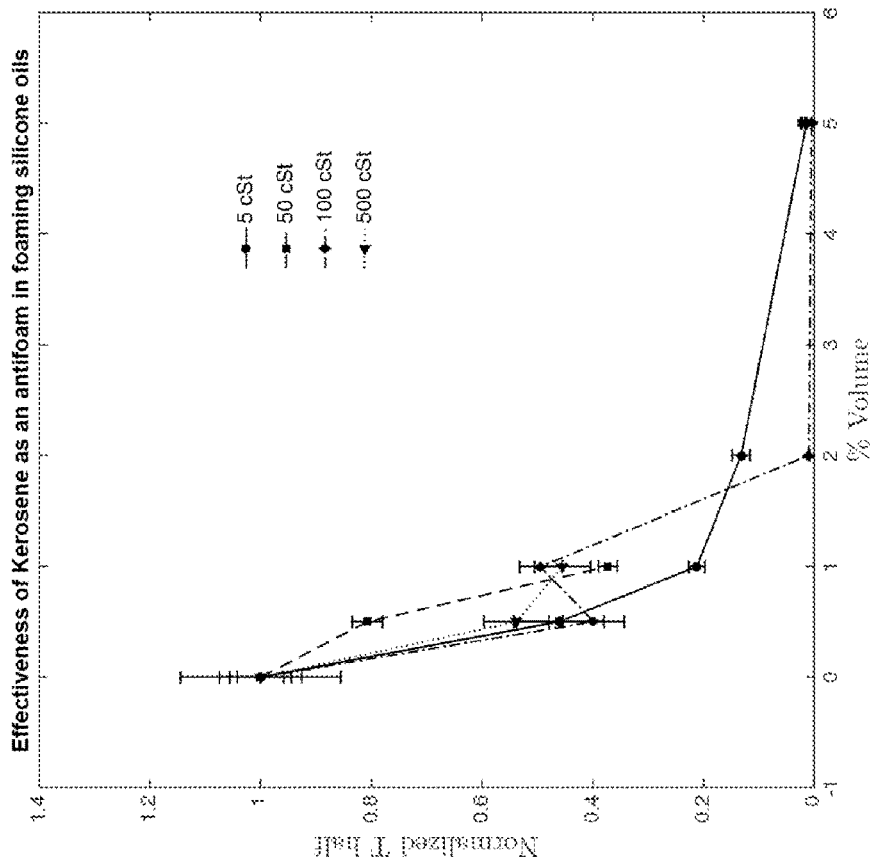

Results in FIGS. 3A-B show the antifoam mechanism functions across a range of volume fraction: 5%, 2%, 1%, and 0.5%. Volume concentrations for the antifoam liquid here are between 0.5% and 5% and the target liquid are between 99.5% and 95%. The antifoam mechanism is also seen to be effective across a range of viscosity of foaming fluid, across 2 orders of magnitude: 5 cSt, 50 cSt, 100 cSt, and 500 cSt. Here the inventors show results for silicone oils of varying viscosities as the foaming liquid, with varying volume fractions of the sample antifoam liquid kerosene. FIG. 3B shows that this mechanism is also effective in different systems, where one could vary the foaming fluid and/or the antifoam fluid. Here the inventors show results for 100 cSt silicone oil as the foaming liquid, with varying volume fractions of the sample antifoam liquids kerosene, toluene, and xylene.

Figure 4:
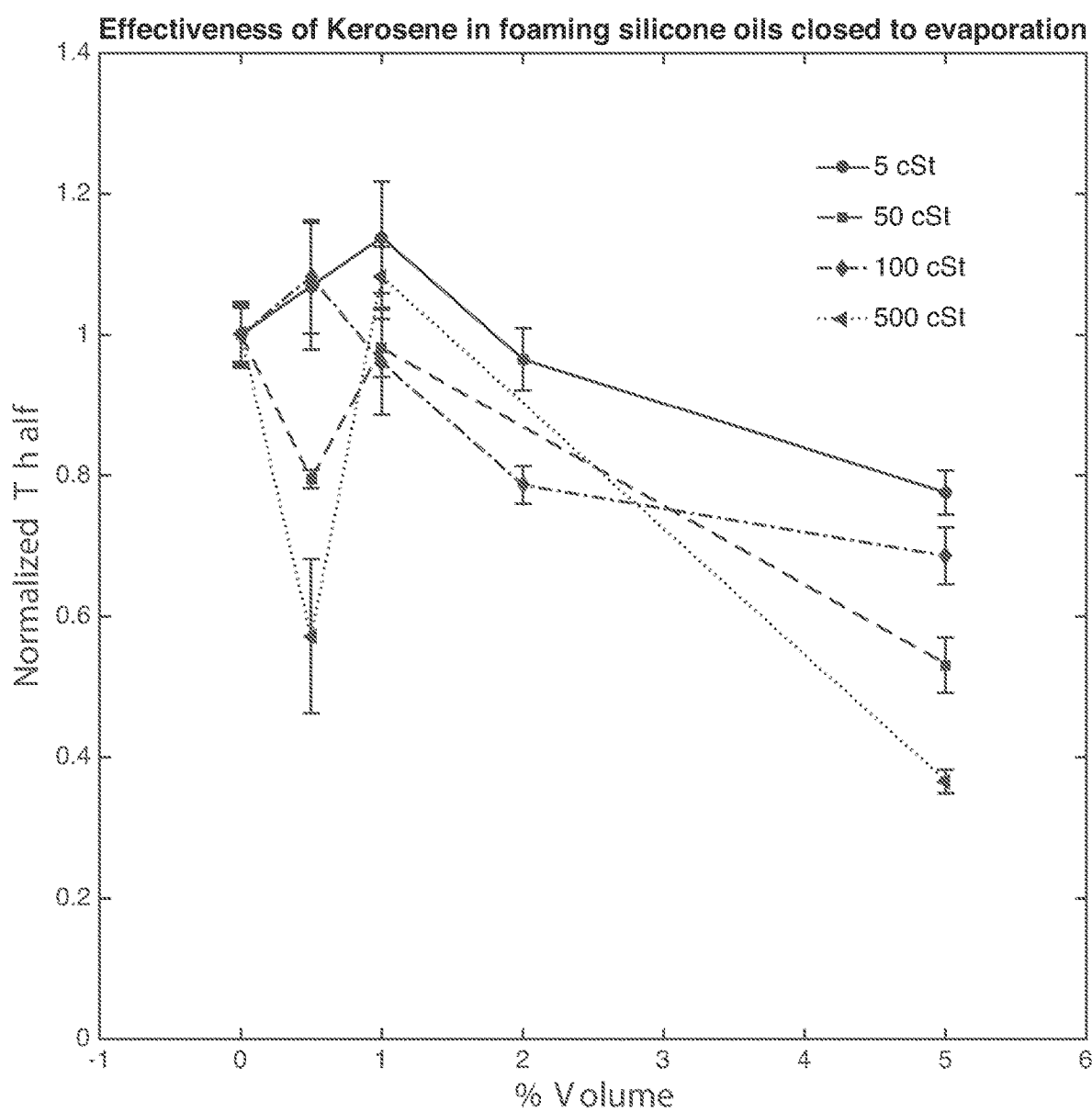
FIG. 4 shows according to an exemplary embodiment of the invention the normalized mean lifetime of bubbles in the absence of evaporation for different foaming liquids (5 cSt, 50cSt, 100 cSt, 500 cSt silicone oil) each treated with a miscible antifoam (Kerosene). In the absence of evaporation, the antifoaming effect is reduced, which establishes that the proposed miscible antifoams function via evaporation driven Marangoni flows.

The results from the single-bubble experiments clearly illustrate that foams in mixtures with a miscible antifoam are less stable compared with the pure foaming fluid (in some cases up to 10× less stable). The stability of samples is also seen to decrease with an increasing volume fraction of miscible antifoam fluid, with this effect more pronounced in higher viscosity foaming liquids with their higher baseline propensity for foaming. Trials closed to evaporation do not experience the same extent of destabilization due to presence of a miscible antifoam (FIG. 4) and demonstrate the destabilization is not solely due to viscosity changes with the antifoam addition. These observations provide evidence for the theoretical basis that solutocapillary flows resulting from differential multicomponent evaporation play a key role in this novel antifoam mechanism.

A miscible antifoam is effective when the evaporation induced Marangoni flows are directed radially outwards. In other words, the depth averaged radial velocity ($v_r$) of the fluid, $$\langle v_r \rangle = \frac{1}{h}\int_0^h v_r dz \propto \frac{h}{\mu}\frac{\partial \gamma}{\partial r} \qquad \text{Equation 1}$$

should be positive. Here h is the local film thickness, $\mu$ the bulk viscosity and r the radial coordinate with its origin at the bubble apex. The local surface tension is:

$$\gamma = \gamma(c(r,\theta,t), \Delta\gamma, \gamma_{nv})$$

$\theta$ is the polar coordinate, $\Delta\gamma = \gamma_v - \gamma_{nv}$ is the equilibrium surface tension differential between the volatile and the non-volatile species in the system, and c is the local antifoam concentration. Upon closer inspection, Equation 1 implies that antifoams are effective if the radial surface tension gradient is positive (surface tension lowest at the bubble apex and increasing moving away from the apex):

$$\left.\frac{\partial \gamma}{\partial r}\right|_{evap} > 0.$$

The above criteria then give rise to the following practical condition for selection of miscible antifoams: the evaporating liquid must have a higher surface tension, to create the required gradient. For a non-volatile foaming liquid (e.g. lubricants like silicone oils), a miscible antifoam is effective if the antifoam is more volatile and has a higher surface tension than the foaming liquid. On the other hand, for a volatile foaming liquid (e.g. fuels like diesel), though found more rarely, a miscible antifoam is effective if the antifoam is relatively non-volatile and has a lower surface tension than the foaming liquid.

It is noted that designing a miscible antifoam leveraging this mechanism as discussed herein (e.g. Equation 1) has proved to be challenging in the art. The key innovation is that destabilizing Marangoni flows can be induced using miscible antifoams by choosing a target liquid and a miscible liquid having the conditions:
1. the target liquid surface tension and the target liquid volatility are both lower than the antifoam liquid surface tension and the antifoam liquid volatility, or
2. the target liquid surface tension and target liquid volatility are both higher than the antifoam liquid surface tension and antifoam liquid volatility.

In further embodiments, the invention can also be regarded as significant improvements in the art considering the language wherein the improvement comprises, a miscible antifoam formulation or method consisting essentially of, or a miscible antifoam formulation or method consisting of.

What is claimed is:

1. A method of controlling foam using a miscible antifoam formulation, comprising:
   (a) having a target liquid having a target liquid surface tension and a target liquid volatility; and
   (b) selecting an antifoam liquid having an antifoam liquid surface tension and an antifoam liquid volatility,
      wherein in the steps (a) and (b) ensuring that the antifoam liquid surface tension and the antifoam liquid volatility are both lower than the target liquid surface tension and the target liquid volatility, or
      wherein in the steps (a) and (b) ensuring that the antifoam liquid surface tension and antifoam liquid volatility are both higher than the target liquid surface tension and target liquid volatility; and
   (c) mixing the target liquid and the antifoam liquid to create the miscible antifoam formulation,
   wherein, as a result of the selecting step of the antifoam liquid surface tension and the antifoam liquid volatility, foam of the target liquid is controlled by evaporation-induced Marangoni flows due to a positive surface tension gradient.

2. The method as set forth in claim 1, wherein in the mixing step controlling volume concentrations for the antifoam liquid are between 0.5% and 5% and the target liquid are between 99.5% and 95%.

3. The method as set forth in claim 1, wherein the antifoam liquid is Kerosene, Toluene, Xylene, or a combination thereof.

4. The method as set forth in claim 1, wherein the target liquid is a lubricant or a diesel fuel.

5. The method as set forth in claim 1, wherein the target liquid is a diesel fuel and the antifoam liquid is Toluene or Xylene.

6. The method as set forth in claim 1, wherein the target liquid is a lubricant and the antifoam liquid is Kerosene.

* * * * *